US008616675B2

(12) United States Patent
Casella et al.

(10) Patent No.: US 8,616,675 B2
(45) Date of Patent: *Dec. 31, 2013

(54) LOW-ADHESION COATING TO ELIMINATE DAMAGE DURING FREEZE/THAW OF MEMSJET PRINTHEADS

(75) Inventors: James M. Casella, Webster, NY (US); Andrew W. Hays, Fairport, NY (US); Peter M. Gulvin, Webster, NY (US); Jun Ma, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 490 days.

This patent is subject to a terminal disclaimer.

(21) Appl. No.: 12/793,887

(22) Filed: Jun. 4, 2010

(65) Prior Publication Data

US 2011/0298866 A1 Dec. 8, 2011

(51) Int. Cl.

| | |
|---|---|
| ***B41J 2/015*** | (2006.01) |
| ***B21D 53/76*** | (2006.01) |
| ***B23P 17/00*** | (2006.01) |

(52) U.S. Cl.
USPC ........................................... 347/20; 29/890.1

(58) Field of Classification Search
None
See application file for complete search history.

(56) References Cited

U.S. PATENT DOCUMENTS

| | | | | |
|---|---|---|---|---|
| 5,387,440 A * | 2/1995 | Takemoto et al. | ......... | 427/443.1 |
| 2011/0122195 A1* | 5/2011 | Kovacs et al. | .................. | 347/45 |

* cited by examiner

*Primary Examiner* — Matthew Luu
*Assistant Examiner* — Erica Lin
(74) *Attorney, Agent, or Firm* — MH2 Technology Law Group LLP

(57) ABSTRACT

Actuator ink chamber systems and methods of making the same and ink jet printheads. The actuator ink chamber systems and ink jet print heads having an ink chamber with a low-adhesion coating applied on at least one portion of the inner surface of the ink chamber to reduce or eliminate actuator membrane damage during ink freeze/thaw cycles.

20 Claims, 2 Drawing Sheets

LOW-ADHESION COATING TO ELIMINATE DAMAGE DURING FREEZE/THAW OF MEMSJET PRINTHEADS

DETAILED DESCRIPTION

1. Field of the Use

The present teachings relate generally to ink jet marking systems and, more particularly, to actuator ink chamber systems in an ink jet printhead using a low-adhesion coating to eliminate system damage during ink freeze/thaw cycles.

2. Background

Conventional solid ink printers, for example, a micro-electro-mechanical system jet (MEMSjet) printer, create an image on a substrate by melting ink and delivering the melted ink to a printhead reservoir, where it is then transferred onto the substrate through a face plate in the printhead.

When the solid ink printer is turned off or otherwise loses power, the ink that remains in the printhead reservoir can freeze or solidify and decrease in volume by about 15-20% as the ink temperature drops from an operating temperature of about 120° C. to a room temperature of about 21° C. If the flexible, drop-ejecting membranes located in the printhead are in intimate contact with the ink as the ink freezes, the membranes can be deformed to the point of breaking as a result of the ink volume decrease. Upon thawing, the volume increase of the ink in the ink chamber of the printhead can add pressure to the printhead, leading to added pressure to the membranes.

After the printer undergoes a freeze/thaw cycle, the performance of the printheads can degrade due to broken membranes. Further, once broken, the membranes can no longer be used to eject ink drops, and ink can then get under the membranes and into the rest of the vent system of the printhead, which can severely damage or destroy the printhead. For example, the electrical field that is needed to pull (and ultimately release) the membrane from the electrically conductive landing pad may be shorted. The thawing process can also cause enough pressure buildup to delaminate the nozzle plate from the chamber sidewalls, thereby damaging or destroying the printhead.

A conventional method of preventing this damage includes de-priming ink from the printhead prior to a normal printer shutdown. The de-priming process requires an additional subsystem attached to the printhead and is only useful for controlled printer shutdowns. In uncontrolled printer shutdowns, like power outages, this conventional de-priming subsystem and method may not work due to the uncertainty of the uncontrolled shutdowns.

Thus, there is a need to overcome this and other problems of the prior art and to provide materials and systems for ink jet printers to reduce or eliminate printhead damage during freeze/thaw cycles.

SUMMARY

According to various embodiments, the present teachings include an actuator ink chamber system. The actuator ink chamber system can include an ink chamber defined by a nozzle plate, a chamber sidewall, and an actuator member. The actuator member can be configured to eject ink from the ink chamber through a nozzle of the nozzle plate. As disclosed, a low-adhesion coating can be disposed on at least one portion of an inner surface of the ink chamber, wherein the low-adhesion coating has a low sliding angle ranging from about 1° to about 30° with the ink in the ink chamber.

According to various embodiments, the present teachings also include an ink jet printhead. The ink jet printhead can include a plurality of actuator ink chamber systems. Each of the plurality of ink chamber systems can include a plate ceiling including a nozzle; an actuator member disposed substantially parallel to the plate ceiling and configured to eject an ink drop through the nozzle of the plate ceiling; and a chamber sidewall disposed between the plate ceiling and the actuator member to form an ink chamber. Each of the plurality of ink chamber systems can also include a low-adhesion coating disposed on at least one portion of an inner surface of the ink chamber. The low-adhesion coating can have a low sliding angle ranging from about 1° to about 30° with a liquid selected from the group consisting of a UV gel ink, a solid ink, a phase-change ink, an aqueous-based ink, hexadecane, dodecane, hydrocarbon, water and a combination thereof.

According to various embodiments, the present teachings further include a method of forming an actuator ink chamber system. In this method, a nozzle plate can be configured with one or more sidewalls to form an opening on the nozzle plate and surrounded by the sidewalls. An actuator membrane can then be provided. A low-adhesion coating can be applied to at least one surface portion of one or more of the opening and the actuator membrane. The low-adhesion coating can have a low sliding angle ranging from about 1° to about 30° with one or more of an oil-based ink and a water-based ink. The exemplary actuator ink chamber system can then be formed by attaching the opening to the actuator membrane to form an ink chamber with an inner surface including the low-adhesion coating.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
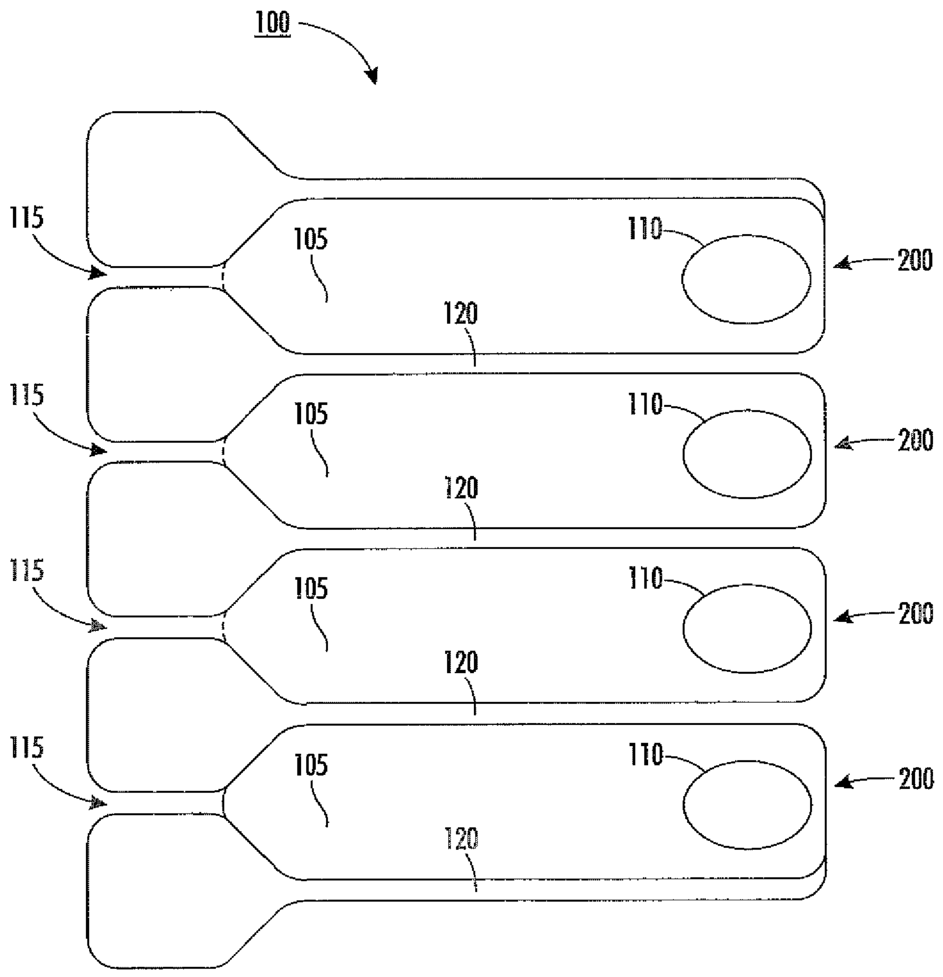
FIG. 1 depicts an exemplary actuator system within a printhead of an ink jet printer in accordance with various embodiments of the present teachings.
Figure 2:
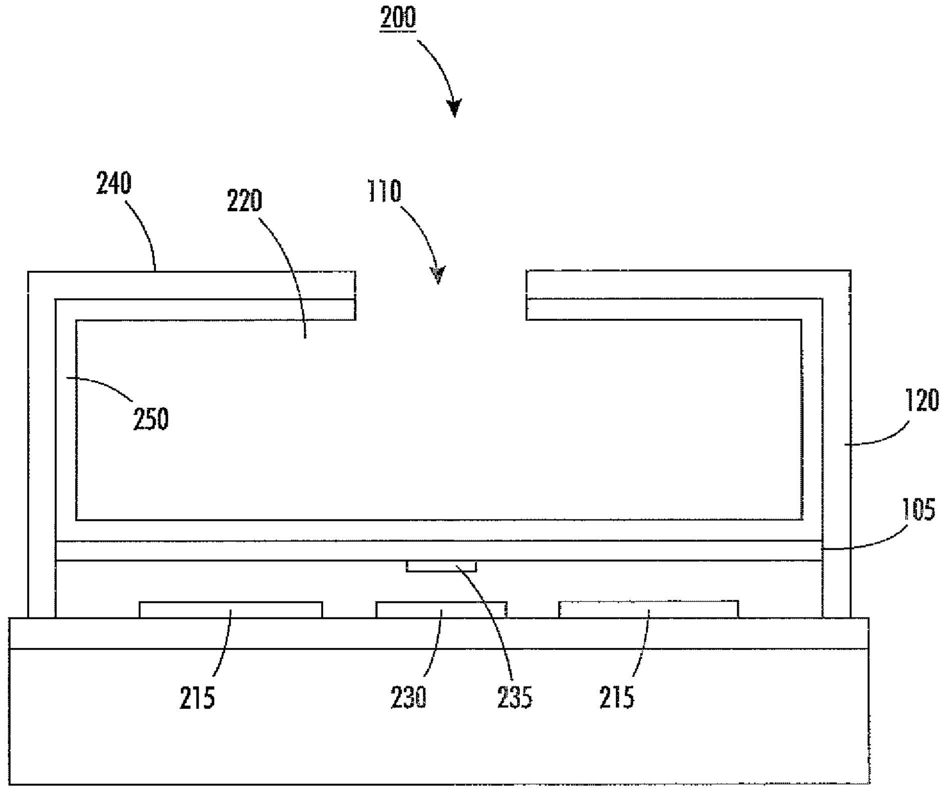
FIG. 2 depicts a cross section of an exemplary actuator ink chamber system in accordance with various embodiments of the present teachings.

FIGS. 1-2 depict various exemplary embodiments for materials, systems, and methods employed for an ink jet printer where ink can be delivered through a nozzle or aperture to an image receiving substrate in solid ink systems including, for example, MEMSjet and/or piezo ink jet systems. The ink can be delivered through an actuator system of a printhead or a similar component. The actuator system can include an ink chamber.

In embodiments, a low-adhesion coating can be applied to at least one surface portion of an ink chamber of solid ink systems. The ink chamber can be defined by a nozzle plate, chamber sidewalls, and an actuator membrane. Due to the application of the low-adhesion coating, surface adhesion between the freezing ink and the coated surfaces can be reduced. This can allow the freezing ink to be separated from the ink chamber surfaces without generating excessive forces that are conventionally created during a freeze/thaw cycle of the printhead.

FIG. 1 depicts an exemplary actuator system 100 within a printhead of an ink jet printer in accordance with various embodiments of the present teachings.

As shown in FIG. 1, the actuator system 100 can include a plurality of actuator ink chamber system 200 that can each be configured to eject ink drops from the printhead onto an image receiving substrate. An exemplary actuator ink chamber system 200 can be depicted in FIG. 2 in accordance with various embodiments of the present teachings. Note that FIG. 2 depicts a cross sectional view of an exemplary actuator ink chamber system, while FIG. 1 depicts a top view of the plurality of actuator ink chamber systems.

It should be readily apparent to one of ordinary skill in the art that the system 100 or 200 depicted in FIGS. 1-2 represents a generalized schematic illustration and that other components can be added or existing components can be removed or modified.

As seen in FIG. 1, a plurality of actuator ink chamber systems 200 can be included within a printhead, through which ink can exit the printhead. Each of the actuators 200 can include an ink feed 115 and a nozzle 110. The nozzle 110 can be located on an end of the respective actuator ink chamber system 200 opposite to that of the ink feed 115. Ink can enter each actuator ink chamber system 200 through the ink feed 115 and exit the system 200 through the nozzle 110.

In embodiments, each of the plurality of actuator ink chamber systems 200 can eject ink drops independently or in combination with another of the plurality of actuator ink chamber systems 200, depending on the configuration of the print job. The plurality of actuator ink chamber systems 200 can be separated by one or more sidewalls 120 as shown in FIG. 1.

In FIGS. 1-2, exemplary actuator ink chamber system 200 can include a polysilicon membrane 105 and a set of electrodes 215.

The polysilicon membrane 105 can be configured to contain ink above the polysilicon membrane 105. The polysilicon membrane 105 as depicted can be merely exemplary and can include any suitable combination of materials and sizes. The polysilicon membrane 105 can further be configured to be electrostatically pulled down toward electrodes 215 and then released.

An electrical signal such as a voltage waveform can be applied across the set of electrodes 215 that can result in an excitation pulse to cause the polysilicon membrane 105 to be electrostatically pulled down towards the set of electrodes 215. It should be appreciated that the set of electrodes 215 can be in any combination or location within the actuator system.

Above the polysilicon membrane 105, there can be an ink chamber 220, wherein ink can enter the ink chamber 220 through the ink feed 115 and can be ejected as ink drops through the nozzle 110 of a plate ceiling 240. The ink chamber 220 can be defined by the plate ceiling 240, the actuator membrane (see 105 of FIGS. 1-2), and the ink chamber sidewall(s) 120. In embodiments, the plate ceiling 240 and the actuator membrane can be configured substantially parallel with one another and can have the chamber sidewall(s) 120 connected there-between to form the ink chamber 220.

When the exemplary polysilicon membrane 105 is pulled down towards the set of electrodes 215, the pressure within the actuator ink chamber system 200 can decrease and the amount of ink can increase in the area of the ink chamber 220, above the polysilicon membrane 105. Further, in various embodiments, the demand for ink in the actuator ink chamber system 200 can induce a negative pressure transient in the ink feed 115. Ink can enter the chamber 220 through the ink feed 115 located at one end of each of the plurality of actuator ink chamber systems 200.

When the voltage across the set of electrodes 215 is removed, the polysilicon membrane 105 can release, and ink present in the chamber 220 above the polysilicon membrane 105 can be forced out of the actuator ink chamber system 200 through the nozzle 110 as ink drops. This is due to the pressure generated by the release of the polysilicon membrane 105. Ink drops can then be ejected from the respective actuator ink chamber system 200.

As shown in FIG. 2, the actuator ink chamber system 200 can also include a dimple 235 and a landing pad 230. In various embodiments, the landing pad 230 can be located between the set of electrodes 215, and the dimple 235 can be located on the underside of the polysilicon membrane 105 in order to ensure that the polysilicon membrane 105 does not touch the electrodes 215. Further, the dimple 235 can be configured to extend the length of the polysilicon membrane 105. During the ink ejecting process, the dimple 235 can be configured to touch down on the landing pad 230 to absorb the force of the pulldown of the polysilicon membrane 105.

Various embodiments can include a low-adhesion coating 250 coated on at least one surface portion of the ink chamber 220 of each actuator ink chamber system 200. As disclosed, the at least one surface portion of the ink chamber 220 can include a portion of one or more surfaces of the plate ceiling 240, the chamber sidewalls 120, and the polysilicon member 105. Note that although the low-adhesion coating 250 is disposed on all surfaces of the ink chamber in FIG. 2, one of ordinary skill in the art would understand that the coating 250 can be disposed on one or more selected surface portions of an inner surface of the ink chamber 220.

In embodiments, the ink chamber 220 can have a cross sectional shape including, but not limited to, a square, a rectangle, a circle, or other suitable shapes for ink jet printers.

In various embodiments, the plate ceiling 240 can be in a form of a plate, a sheet, a film, a bar, or other suitable forms. In embodiments, the plate ceiling 240 can be a metal substrate including, for example, steel or aluminum, or can be a plastic substrate including, for example, polyimide, polyphenylene sulfide, polyimide imide, polyketone, polyphthalamide, polyetheretherketone (PEEK), polyethersulfone, polyetherimide, and polyaryletherketone. In a specific embodiment, the plate ceiling 240 can be a conventional ink jet printhead nozzle plate having the low-adhesion coating 250 disposed thereon.

The chamber sidewall(s) 120 can be formed by a material including, but not limited to, silicon, polymers such as SU8, and/or plastics. In a specific embodiment, the chamber sidewall(s) 120 can be conventional chamber sidewall(s) having the low-adhesion coating 250 disposed thereon.

In embodiments, the low-adhesion coating 250 can be oleophobic and can have an oil contact angle with exemplary oils of hexadecane, dodecane, hydrocarbons, organic-based ink including solid ink and UV gel ink, etc. In embodiments, the oil contact angle of the low-adhesion coating 250 can be at least about 45°, for example, ranging from about 45° to about 90°, or more than about 90°.

In embodiments, the low-adhesion coating 250 can be hydrophobic and can have a water contact angle of at least about 60°, for example, ranging from about 60° to about 120°, or more than about 120°.

In embodiments, on surface of the low-adhesion coating 250, a ~10-15 μL water-based and/or oil-based drop can tend to bead up and can have a sliding angle with the low-adhesion coating surface. In embodiments, the water-based and/or oil-based drop can be a water-based and/or oil-based ink drop.

As used herein, the term "low-adhesion" refers to a low sliding angle of a water-based or an oil-based drop with a low-adhesion coating surface, wherein the low sliding angle can be less than about 30°, for example, ranging from about 1° to about 30°, or ranging from about 25° to about 30°, or ranging from about 1° to about 20°, or ranging from about 1° to about 15°, when measured with a liquid drop of the above described oils, water, oil-based inks, and/or water-based inks.

In embodiments, the low-adhesion coating 250 can provide low-adhesion between the ink chamber surfaces and ink in the ink chamber 220, as measured by the low sliding angle. As compared with conventional actuator systems without use of the disclosed low-adhesion coating, surface adhesion between the solidifying or freezing ink and the low-adhesion coating of the chamber can be reduced. That is, ink can be separated from the inner surfaces of the ink chamber without generating excessive forces that are conventionally created during freeze/thaw cycles of the printhead. Additionally, use of the low-adhesion coating 250 on at least one surface portion of the ink chamber 220 can relieve the stress inside the chamber, preventing actuator membrane breakage.

For example, the use of the low-adhesion coating 250 can reduce or eliminate membrane stress caused during a freezing process. In an exemplary embodiment, no membrane failures can be observed due to this reduced stress, when a total of 96 actuator membranes are used in the printhead.

In embodiments, the use of the low-adhesion coating 250 can reduce or eliminate membrane breakage. For example, printheads using low-adhesion coatings can have a 14-time reduction in membrane breakage in an exemplary experiment as compared with conventional printhead without using the low-adhesion coating.

In embodiments, the low-adhesion coating 250 can be made of a material including, but not limited to, fluoroctatrichlorosilane, TEFLON® materials including, for example, TEFLON® PFA (perfluoroalkoxy), TEFLON® PTFE (polytetrafluoroethylene), and TEFLON® FEP (fluorinated ethylene propylene), fluorinated diamond-like carbon, and a mixture thereof.

In embodiments, the low-adhesion coating 250 can include Components A, B, and C, wherein Component A can be a hydroxyl functionalized polyester, such as Desmophen® (available from Bayer Materials Science); Component B can be an isocyanate, such as Desmodur® or Bayhydur® (available from Bayer Materials Science); and Component C can be a hydroxyl functionalized polysiloxane crosslinking material, such as BYK-Silclean® (available from BYK Additives and Instruments).

Component A of the low-adhesion coating 250 can be any suitable polymer or oligomer containing hydroxyl (—OH) functional groups. For example, Component A can be selected from the group consisting of hydroxyl functional polymers or oligomers such as polyvinyls, polystyrenes, polyacrylates, polyester, polyethers, and mixtures thereof. In a specific embodiment, Component A can be a hydroxyl functional polyacrylate resin sold under the name Desmophen® A 870 BA available from Bayer Materials Science.

Component B of the low-adhesion coating 250 can be any suitable polymer or oligomer containing isocyanate (—NCO) functional groups. For example, Component B can be selected from the group consisting of isocyanate functional polymers or oligomers such as polyvinyls, polystyrenes, polyester, polyacrylates, and mixtures thereof. In embodiments, the isocyanate can be selected from the group consisting of diphenylmethane diisocyanate, toluene diisocyanate, hexamethylene diisocyanate, isophorone diisocyanate, or suitable polymer or oligomer containing isocyanate (—NCO) functional groups, and mixtures thereof. In a specific embodiment, Component B can be a solvent free aliphatic isocyanate resin based on hexamethylene diisocyanate sold under the name Desmodur® N 3300 A available from Bayer Materials Science.

Component C of the low-adhesion coating 250 can be any suitable hydroxyl-functionalized polymer or oligomer containing polysiloxane unit/s. For example, Component C can be selected from the group consisting of hydroxyl-functionalized polymers or oligomers containing polysiloxane unit/s such as polyvinyls, polystyrenes, polyacrylates, polyethers, and mixtures thereof. In a specific embodiment, Component C can be a hydroxyl-functionalized polymer consisting of polysiloxane side-chains on hydroxyl-functional polyacrylate backbone sold under the name BYK-Silclean® 3700 available from BYK Additives and Instruments.

In one embodiment, the low-adhesion coating 250 can be made of an isocyanate, a polylol; and a hydroxyl functionalized polysiloxane.

Optionally, the low-adhesion coating 250 herein can include a Component D including a fluoro-crosslinking material. Any suitable fluoro-crosslinking material can be selected. In embodiments, the hydroxyl-functionalized fluoro-crosslinking material can be a polymer modifier sold under the name Fluorolink®, for example, Fluorolink-D®, Fluorolink-D10H®, Fluorolink-E10H® available from Solvay Solexis.

The Components A, B, C, and/or D of the low-adhesion coating 250 can be present in any suitable amount. For example, Component A can be present in an amount of from about 40 to about 80, or from about 50 to about 75, or from about 55 to 70 weight percent based upon the total weight of the low-adhesion coating. Component B can be present in an amount of from about 15 to about 50, or from about 20 to about 45, or from about 25 to about 40 weight percent based upon the total weight of the low-adhesion coating. Component C can be present in an amount of from about 0.1 to about 15, or from about 1 to about 10, or from about 2 to about 8 weight percent based upon the total weight of the low-adhesion coating. Optional Component D, if present, can be present in an amount of from about 0.01 to about 5, or from about 0.1 to about 3, or from about 1 to about 2 weight percent based upon the total weight of the low-adhesion coating. In other exemplary embodiments, the amount of each of Component A, B, C, and D can not be limited.

In embodiments, the low-adhesion coating 250 can have a thickness ranging from about 10 angstroms to about 2 microns. For example, the low-adhesion coating 250 can have a thickness ranging from about 10 angstroms to about 100 angstroms for coatings of fluoroctatrichlorosilane (FOTS), or ranging from about 100 nanometers to about 2 microns for liquid-phase coated material.

In embodiments, the low-adhesion coating 250 can be formed by one or more processes including, but not limited to, molecular vapor deposition (MVD), chemical vapor deposition (CVD), plasma-enhanced CVD, sputtering, and/or a liquid-based coating process.

For example, the liquid-based coating process can include first forming a liquid composition of the low-adhesion coating. In an exemplary embodiment, the liquid composition of the low-adhesion coating 250 can be made by cross-linking a diisocyanate with a hydroxyl-functionalized polyester in a solvent in the presence of a hydroxyl-functionalized polysiloxane crosslinking material and optionally, in specific embodiments, a second crosslinking fluorolink material. Any suitable solvents can be used including, but not limited to, methyl ethyl ketone, butyl acetate, 7-heptanone, methyl isobutyl ketone, chloroform, methylene chloride, and FCL-52 from Cytonix Corporation.

The liquid composition can then be applied to a surface, for example a surface portion of an ink chamber, by a coating, spray, flow, printing, extrusion, and/or molding technique. The applied liquid composition on the surface can then be dried and/or cured on the surface portion of the ink chamber. The drying or curing procedure can be determined by the materials used for the low-adhesion coating.

In another embodiment, the actuator ink chamber system 200 can be formed by first forming an opening on a nozzle plate and surrounded by one or more sidewalls. In embodiments, the nozzle plate and the opening sidewalls can include those as known in the art.

A low-adhesion coating can then be applied to one or more selected surface portions of one or more of the nozzle plate of the ink opening, the sidewalls of the ink opening, as well as an actuator membrane provided as known in the art.

In embodiments, an omnidirectional deposition by one or more of MVD, CVD, and a liquid-based coating can be used to coat the sidewalls and the nozzle plate inside the opening. In embodiments, a more directional deposition, such as sputtering and plasma-enhanced CVD with a voltage bias can be used to apply the low-adhesion coating substantially on the nozzle plate inside the opening, and in embodiments, prior to or following a coating deposition on the sidewalls of the opening.

Following the application process of the low-adhesion coating, the opening can be, for example, bonded with the actuator membrane to form an ink chamber, wherein at least one surface portion of the nozzle plate, the sidewalls and the actuator membrane can have the disclosed low-adhesion coating disposed thereon. In embodiments, the actuator membrane can be one of a plurality of actuator membranes in an actuator wafer. The actuator wafer can be singulated before or after the attaching or bonding process between the actuator membrane and the opening.

In exemplary embodiments, an MVD self-assembled monolayer (SAM) of fluoroctatrichlorosilane (FOTS) can be formed as a low-adhesion coating on one or more surface portions inside the ink chamber 220 as shown in FIG. 2.

In one example, the low-adhesion coating 250 can be applied to the actuator membrane (see 105 in FIGS. 1-2) to separate the freezing or solidifying ink from the membrane before the force gets high enough to break the membrane.

In another example, the low-adhesion coating 250 can be applied to the chamber sidewalls 120, regardless if the low-adhesion coating 250 is applied to the membrane or not, to release the stress generated inside the chamber by the detachment of the solidifying ink from the sidewalls 120.

In an additional example, the low-adhesion coating 250 can be applied to the nozzle plate 240 to allow air to enter and leave through the nozzle 110 during freeze/thaw conditions of the printhead, additionally alleviating stress.

The following examples are illustrative of the present teachings and the advantageous properties, and are not to be taken as limiting the disclosure or claims in any way. In this example, as well as elsewhere in this application, all parts and percentages are by weight unless otherwise indicated.

EXAMPLES

ABACUS modeling, a known modeling method in the art, was used to examine the disclosed materials, systems and methods.

Example 1

This exemplary ABACUS model used the following modeling conditions: (1) about 17% ink shrinkage occurred during an ink solidifying process, (2) ink was in contact with all surfaces of the ink chamber, and (3) a no nozzle plate was used. The "no nozzle plate" geometry was used, because once the ink detaches from the nozzle plate, air can rush in and out of the nozzle. The nozzle was then considered as no longer present, just like a "no nozzle plate".

For a conventional ink chamber system, the modeling resulted in a Von Mises stress of about 378 MPa in the actuator membrane.

For a disclosed ink chamber system having low-adhesion coating applied on the inner surface of the ink chamber, the modeling resulted in a Von Mises stress in the actuator membrane of about 185 MPa, by a 51% reduction in membrane stress.

Example 2

A group of ink chambers out of 96 total chambers were tested at various ink conditions including: at an initial setup having ink contacting all surfaces of the ink chamber, before ink freezing, and after ink freezing, e.g., when thawing.

The modeling results showed that actuator membrane damage was eliminated in a freeze/thaw cycle to all 96 chambers, when a no nozzle plate was used.

Example 3

In this example, SAM FOTS coating was applied on the inner surface of the ink chamber. The sliding angle for a 10 uL drop of a test liquid to start moving on the FOTS coated surface was measured of about 25° to about 30°. The test liquid included hexadecane (a proxy for solid ink). In some examples, the low-adhesion coatings had a sliding angle of less than about 5°.

During the freeze/thaw cycles, no ink was observed under the actuator membranes. However, one crack was observed in one membrane out of the 96 exemplary actuator membranes. This was 14 times better than the control sample which had 14 cracks under the same condition.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising."

Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. An actuator ink chamber system comprising:

an ink chamber formed by a nozzle plate, a chamber sidewall, and an actuator member, wherein the actuator member is configured to eject ink from the ink chamber through a nozzle of the nozzle plate; and a low-adhesion coating disposed on at least one portion of an inner surface of the ink chamber, wherein the low-adhesion coating has a low sliding angle ranging from about 1° to about 30° with the ink in the ink chamber.

2. The system of claim 1, wherein the low-adhesion coating has a low sliding angle ranging from about 1° to about 15° with a liquid comprising a UV gel ink, a solid ink, a phase-change ink, a water-based ink, hexadecane, dodecane, hydrocarbon, or water.

3. The system of claim 1, wherein the low-adhesion coating has an oil contact angle ranging from about 45° to about 90°.

4. The system of claim 1, wherein the low-adhesion coating has a water contact angle ranging from about 60° to about 120°.

5. The system of claim 1, wherein the low-adhesion coating has a thickness ranging from about 10 angstroms to about 2 microns.

6. The system of claim 1, wherein the low-adhesion coating is made of a material comprising fluoroctatrichlorosilane, polytetrafluoroethylene (PTFE), perfluoroalkoxy (PFA), fluorinated ethylene propylene (FEP), or fluorinated diamond-like carbon.

7. The system of claim 1, wherein the low adhesion coating comprises an isocyanate, a polylol, and a hydroxyl functionalized polysiloxane.

8. The system of claim 1, wherein the low adhesion coating comprises a polymer or oligomer comprising an isocyanate functional group; a polymer or oligomer comprising a hydroxyl functional group; one or more of a hydroxyl functionalized polymer or oligomer comprising at least one polysiloxane unit, and a hydroxyl functionalized fluoro-crosslinking material.

9. The system of claim 1, wherein the low-adhesion coating comprises a self-assembled monolayer of fluoroctatrichlorosilane by a molecular vapor deposition.

10. An ink jet printhead comprising:

a plurality of actuator ink chamber systems, where each of the plurality of ink chamber systems comprises:

a plate ceiling comprising a nozzle;

an actuator member disposed substantially parallel to the plate ceding and configured to eject an ink drop through the nozzle of the plate ceiling;

a chamber sidewall disposed between the plate ceiling and the actuator member to form an ink chamber; and a low-adhesion coating disposed on at least one portion of an inner surface of the ink chamber; wherein the low-adhesion coating has a low sliding angle ranging from about 1 to about 30° with a liquid selected from the group consisting of a UV gel ink, a solid ink, a phase-change ink, an aqueous-based ink, hexadecane, dodecane, hydrocarbon, water and a combination thereof.

11. The printhead of claim 10, wherein the low-adhesion coating has an oil contact angle ranging from about 45° to about 90°, and a water contact angle ranging from about 60° to about 120°.

12. The printhead of claim 10, wherein the low-adhesion coating is a self-assembled monolayer of fluoroctatrichlorosilane (FOTS).

13. The printhead of claim 10, wherein the low-adhesion coating has a thickness ranging from about 10 angstroms to about 2 microns.

14. A method of forming an actuator ink chamber system comprising:

configuring a nozzle plate with one or more sidewalk to form an open on the nozzle plate and surrounded by the sidewalls;

providing an actuator membrane;

applying a low-adhesion coating to at least one surface portion of one or more of the opening and the actuator membrane; wherein the low-adhesion coating has a low sliding angle ranging from about 1° to about 30° with one or more of an oil-based ink and a water-based ink; and attaching the opening to the actuator membrane to form an ink chamber, wherein an inner surface of the ink chamber comprises the low-adhesion coating.

15. The method of claim 14, wherein applying the low-adhesion coating comprises a process comprising a molecular vapor deposition (MVD), a chemical vapor deposition (CVD), a plasma enhanced CVD, a sputtering, or a liquid-based coating process.

16. The method of claim 14 further comprising omnidirectionally depositing the low-adhesion coating on the nozzle plate and the sidewalls inside the opening.

17. The method of claim 14 further comprising directionally depositing the low-adhesion coating on the nozzle plate inside the opening using a sputtering or a plasma-enhanced CVD.

18. The method of claim 14 further comprising applying a self-assembled monolayer of fluoroctatrichlorosilane (FOTS) to the at least one surface portion of one or more of the opening and the actuator membrane by a molecular vapor deposition (MVD).

19. The method of claim 14 further comprising:

applying the low-adhesion coating to the actuator membrane to reduce membrane breakage during an ink solidifying process, or applying the low-adhesion coating to the sidewalls to release a stress generated inside the ink chamber during an ink solidifying process.

20. The method of claim 14 further comprising applying the low-adhesion coating to the nozzle plate to allow for an air communication through a nozzle thereof during an ink freeze/thaw cycle in the ink chamber.

* * * * *